June 24, 1969  J. A. E. HABERKORN ET AL  3,451,624
APPARATUS FOR DIRECTING FLUID FLOW
Filed July 21, 1967
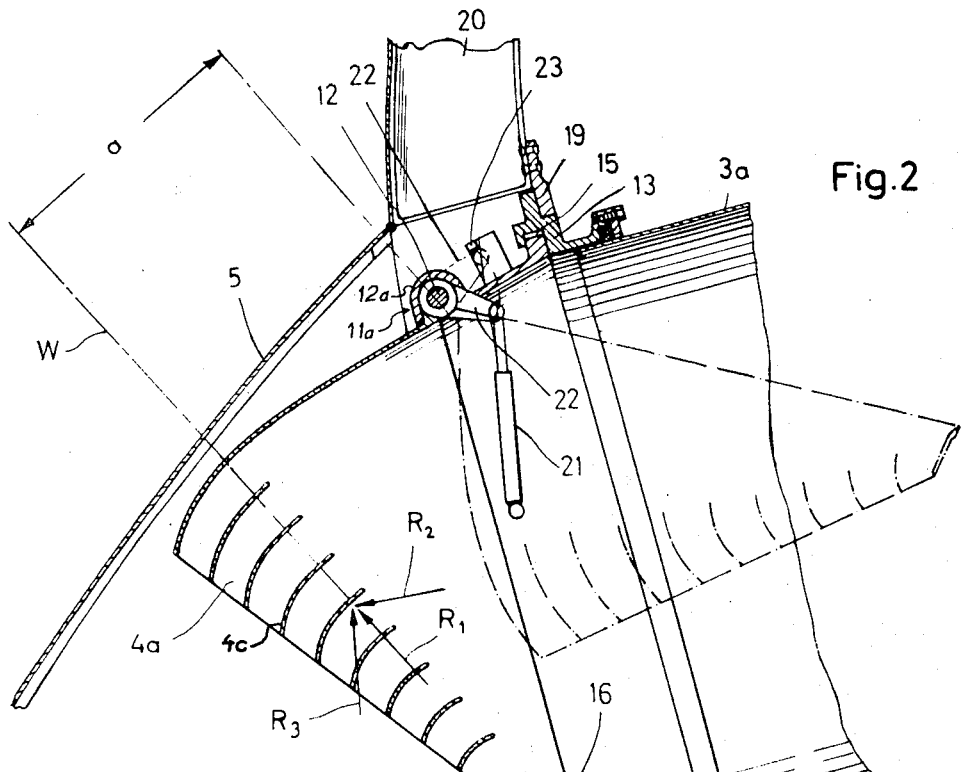
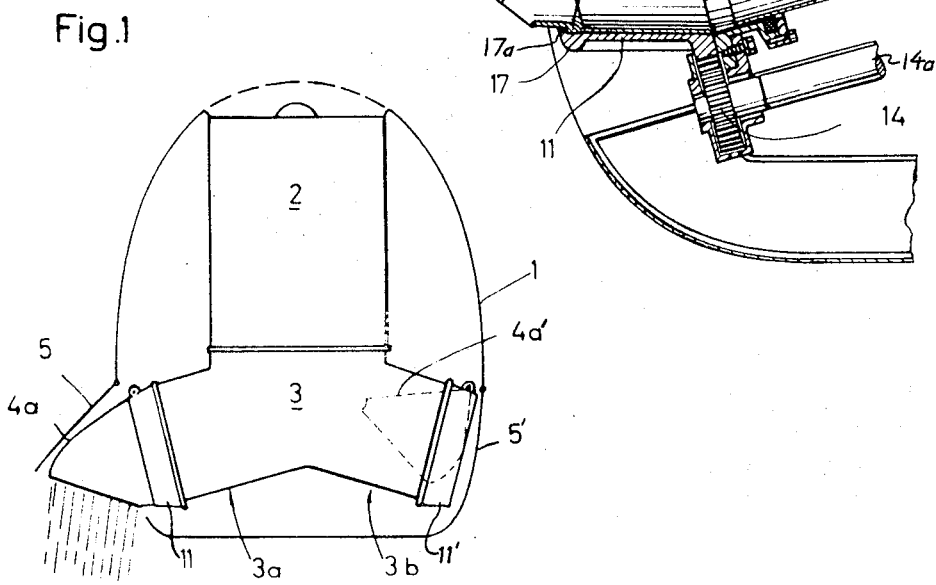
INVENTORS.
JOSEPH A. ERICH HABERKORN
WILHELM F. LÖBBECKE
BY William K. Serp
ATTORNEY

United States Patent Office 3,451,624
Patented June 24, 1969

3,451,624
APPARATUS FOR DIRECTING FLUID FLOW
Joseph A. Erich Haberkorn, Riemerling, and Wilhelm F. Löbbecke, Munich, Germany, assignors to Entwicklungsring Sud G.m.b.H., Munich, Germany
Filed July 21, 1967, Ser. No. 655,059
Claims priority, application Germany, July 23, 1966,
B 88,149
Int. Cl. B64c 15/04, 9/38
U.S. Cl. 239—265.33                6 Claims

ABSTRACT OF THE DISCLOSURE

A thrust-deflection apparatus which is particularly adapted for cooperation with the exhaust pipe of an aircraft jet engine. A nozzle is positioned adjacent the exhaust orifice of the pipe. Actuating means are provided for shifting the nozzle from an extended position adjacent the exhaust orifice of the exhaust pipe to a retracted position within the exhaust pipe. Rotatable positioning means are included for rotatably turning the nozzle with respect to the axis of the exhaust pipe so as to alter the path of the exhaust jet leaving the nozzle. A safety means is included for preventing operation of the jet engine during certain positions of the nozzle.

---

This invention relates generally to an apparatus for directing the flow of fluid and more particularly relates to an apparatus adapted for use in cooperation with the exhaust pipe of an aircraft jet-propulsion engine for deflecting the exhaust jet therefrom in a predetermined direction.

While the present invention may be adapted for directing the flow of various fluids, it is particularly adapted for directing the exhaust jet of an aircraft jet-propulsion engine and will be described in this regard. The illustrated embodiment of the instant invention is adapted for use with the exhaust pipe of a jet aircraft having vertical take-off and landing capabilities. During take-off or landing, the gas jet from the engine is directed outwardly of the nacelle or aircraft fuselage toward the ground. During horizontal flight, the lift engines are usually disabled with separate cruise engines maintaining flight. It is desirable, upon disablement of the take-off engines, that the apparatus which directs the take-off and landing exhaust jet provide a satisfactory air foil during cruise flight.

One prior apparatus for directing the exhaust jet of vertical take-off and landing aircraft includes a thrust-deflection means in the form of a tubular elbow secured to the exhaust pipe of the engine. Since the exhaust jet is deflected, the elbow is subjected to considerable bending stresses that are in turn transferred to the exhaust pipe to which it is anchored. Such a structure requires the use of relatively heavy and expensive materials. Further, the elbow produces a drag upon the aircraft during cruising flight. With regard to such arrangements, the path of the jet flow is generally fixed with respect to the nacelle of the aircraft, thus preventing use of the vertical take-off engines during normal cruising flight.

A main object of the present invention is to provide an apparatus for directing the flow of fluids. A more specific object is to provide an apparatus particularly adaptable for deflecting the exhaust jet of a vertical take-off and landing aircraft, jet-propulsion engine. A still further object is to provide such a thrust-deflection apparatus which exhibits improved aerodynamic qualities during cruising flight. An additional object is to provide an apparatus for deflecting the exhaust jet of a vertical take-off and landing, jet aircraft which exhibits improved structural features, is relatively light-weight and which provides means for altering the direction of the exhaust jet with respect to the body of the aircraft.

Other objects and advantages of the invention will become apparent with reference to the following description and accompanying drawing which shows an illustrative embodiment of this invention.

FIGURE 1 is a diagrammatic view of a portion of the nacelle of a vertical take-off and landing aircraft provided with a fluid directing apparatus including certain features of this invention.

FIGURE 2 is an enlarged, fragmentary view of the apparatus illustrated in FIGURE 1 showing in phantom a component of the apparatus in its retracted position.

Referring to FIGURE 1, a vertical take-off and landing jet engine 2 is installed within a nacelle 1 of an aircraft. Receiving the jet exhaust from the engine 2 is a bifurcated exhaust pipe 3, the legs 3a and 3b of which define exhaust orifices. Each of the legs 3a and 3b is provided with a selectively positionable and rotatably adjustable thrust-deflection nozzle, 4a and 4a' respectively. Secured to the exhaust legs 3a and 3b and serving to secure the nozzles to their respective legs are conically-shaped cylindrical rings 11 and 11' which include sealing means to be hereinafter described. Means are included to facilitate selective retraction of the nozzles 4a and 4a' into their respective legs 3a and 3b. To facilitate this retraction feature, the area of the exhaust orifice is slightly larger than the largest cross section area of the thrust-deflection nozzle. In the retracted position the thrust-deflection nozzle is completely housed within the exhaust pipe. As previously mentioned, the cylindrical rings 11 and 11' are conically shaped and communicatively connect the exhaust orifice of the exhaust pipe to the reduced intake orifice of the nozzle. The gradual decrease in the cross section area of the rings 11 and 11' minimizes the turbulence introduced into the jet stream by this area reduction.

For illustrative purposes, the nozzle 4a' is shown in its retracted position. Under normal operating conditions, each of the nozzles will be in the same position; i.e., either both retracted or both extended. To improve the air flow characteristics of the nacelle 1 when the jet engine 2 is not in use, a pair of flaps 5 and 5' are hingedly secured to the nacelle frame and are forced open by the nozzles when they are placed in the extended position. In the illustrated embodiment, the axis of rotation of each of the nozzles 4a and 4a' is outside of the exhaust pipe, and as the gas jet is caused to flow through the nozzles, they are forced outwardly to their extended position. After take-off, the lift engine 2 may be turned off and the nozzles retracted into the exhaust pipe allowing the flaps 5 and 5' to close.

Referring more particularly to the enlarged, fragmentary view of FIGURE 2, the discharge orifice of the thrust-deflection nozzle 4a is provided with deflection vanes 4c. The nozzle is affixed to the cylindrical ring 11 by a hinge 11a including a shaft 12 journaled in a bearing 12a. The shaft 12 to which the nozzle 4a is fixed is positioned tangentially to the exterior surface of the nozzle 4a, and the bearing 12a is secured to the exterior surface of the ring 11.

The ring 11 is rotated about the axis of the exhaust pipe by a pinion gear 14 which meshes with the teeth of a ring gear 15 cut upon an outwardly-extending flange of the ring 11. Retaining the ring 11 in position with respect to the exhaust pipe 3a is a bearing sleeve 13 coaxially positioned about the exhaust pipe. The bearing sleeve 13 is provided with an inwardly-disposed circumferential notch which receives the ring gear 15 therein. A drive shaft 14a (not shown) serves to drive the pinion gear 14. Thus, by means of the positioning motor, the nozzle 4a is rotated about the axis of the exhaust pipe 3a correspondingly altering the path of the exhaust jet leaving the nozzle 4a with respect to the nacelle 1. This feature permits the path of the exhaust jet to be varied so that, if desired, the engine can be used as a cruising engine as well as a vertical lift engine.

A portion of the circumferential edge of the nozzle defining the intake orifice is turned outwardly forming a flange the exterior surface of which provides a sealing shoulder 16. In a similar manner, the circumferential edge of the ring 11 adjacent the intake orifice of the nozzle 4a is provided with a flange 17 providing an inwardly-disposed sealing shoulder 17a. In the extended position of the nozzle, the shoulders 16 and 17a mate forming a seal between the nozzle 4a and the ring 11. It will be noted that as the exhaust jet increases in pressure, the seal thus created is improved, since the exhaust jet reacting upon the deflection nozzle forces it outwardly. In this manner, the reaction forces upon the nozzle are transferred to the ring 11 thereby minimizing the stresses to which the hinge 11a is subjected.

If desired, the direction of rotation may be determined and the magnitude of moment effective around the axis of the shaft 12 computed by integrating the moment about the shaft 12 produced by the force vector $R_1$ acting along the vector line W displaced a distance $a$ from the shaft 12. The vector $R_1$ being the resultant vector of the vectors $R_2$ and $R_3$ reacting upon the shell of the nozzle 4a and the vanes 4c. With regard to the thrust-deflection nozzle shown in FIGURE 2, the force moments about the shaft 12 are effective in a clockwise direction: i.e., in a sense that forces the thrust-deflection nozzle to its extended position.

As previously mentioned, the reaction forces upon the thrust-deflection nozzle are transferred to the ring 11 and therefrom through the bearing sleeve 13 to a support flange 19 anchored to a frame member 20 forming a portion of the nacelle 1. The transfer of the reactive forces to the frame 20 reduces the stress upon the exhaust pipe 3a. The exhaust pipe is required to withstand the internal pressure of the exhaust jet; and only to a limited extent the bending forces produced by the exhaust jet reacting upon the nozzle 4a.

Retraction of the nozzle into the phantom position illustrated in FIGURE 2 is accomplished by means of a hydraulic actuator 21 which includes a sleeve wherein a piston is slidably positioned. One end of the piston is connected to a crank arm 22 the remaining end of which is pinned to the shaft 12. Thus, upon actuation of the hydraulic actuator 21, so as to cause outward movement of the piston thereof, the shaft 12 rotates in a counter-clockwise direction as viewed in FIGURE 2 rotating the deflection nozzle 4a to its retracted position illustrated in phantom.

To prevent accidental turn-on of the engine when the nozzle is in its retracted position, the arm 22 engages a microswitch 23 or other suitable control means. In the illustrated embodiment the switch 23 is actuated by the arm 22 or may alternatively be actuated by the thrust-deflection nozzle or by components connected thereto. The microswitch 23 may be connected in any suitable manner to shut off the engine. For example, it may be used to disconect the ignition circuit or cause interruption to the fuel supply and in this way prevent unintentional starting of the engine while the thrust-deflection nozzle is in the retracted position.

An improved fluid flow directing apparatus has been provided which is particularly adapted for vertical take-off and landing aircraft. Although but one specific embodiment of the invention has been herein shown and described, it will be understood that certain details of the construction shown may be altered.

We claim:
1. For cooperation with an exhaust pipe, one end of which defines an exhaust orifice wherethrough pressurized fluid is caused to flow, a flow-directing apparatus comprising a deflection nozzle defining an intake orifice and a discharge orifice, the area defined by the outer edge of the nozzle defining said intake orifice of said nozzle being similar in shape and smaller than the area of the exhaust orifice defined by the exhaust pipe to permit positioning of a portion of said nozzle to a retracted position within said exhaust pipe, selectively operable means for positioning said nozzle between a retracted position within said exhaust pipe and an extended position adjacent the end of said exhaust pipe, and sealing means for sealing a portion of said nozzle defining the intake orifice to the exhaust end of said exhaust pipe.

2. An apparatus in accordance with claim 1 which further includes a rotary positioning means for rotatably turning said nozzle about the axis of said exhaust pipe.

3. An apparatus in accordance with claim 2 which further includes control means operative in response to the position of said nozzle for preventing actuation of the engine when the nozzle is in its retracted position.

4. An apparatus in accordance with claim 1 which further includes a cylindrical ring communicatively interposed between said exhaust pipe and said nozzle and having a first circumferential edge positioned adjacent the exhaust end of said exhaust pipe, and wherein said sealing means includes an inwardly disposed flange about a portion of the periphery of said ring adjacent said nozzle, said flange providing a first shoulder disposed toward the interior of said exhaust pipe, and a second outwardly disposed flange about a portion of the periphery of the intake orifice of said nozzle, said second flange providing a second shoulder for mating contact with said first shoulder so as to provide a seal between said exhaust pipe and said nozzle when the latter is in its extended position.

5. An apparatus in accordance with claim 4 which further includes a hinge member hingedly securing said nozzle to said cylindrical ring, and a rotary positioning means for rotatably turning said cylindrical ring and nozzle with respect to the axis of said exhaust pipe.

6. An apparatus in accordance with claim 5 which further includes control means operative in response to the position of said nozzle for interrupting the flow of fluid through said exhaust pipe as determined by the position of said nozzle.

References Cited
UNITED STATES PATENTS

| | | | |
|---|---|---|---|
| 2,879,014 | 3/1959 | Smith et al. | 239—265.35 X |
| 3,162,011 | 12/1964 | Mullins et al. | 239—265.33 |
| 3,178,887 | 4/1965 | Wilde et al. | 239—265.33 |

FOREIGN PATENTS

| | | |
|---|---|---|
| 688,011 | 2/1953 | Great Britain. |

EVERETT W. KIRBY, *Primary Examiner.*

U.S. Cl. X.R.

239—265.37